(12) United States Patent
Yamanaka

(10) Patent No.: US 8,908,085 B2
(45) Date of Patent: Dec. 9, 2014

(54) TRACKING CONTROLLABLE IMAGE PICKUP APPARATUS

(75) Inventor: Tomoaki Yamanaka, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 487 days.

(21) Appl. No.: 13/180,951

(22) Filed: Jul. 12, 2011

(65) Prior Publication Data

US 2012/0008037 A1  Jan. 12, 2012

(30) Foreign Application Priority Data

Jul. 12, 2010 (JP) .................................. 2010-157795

(51) Int. Cl.
*H04N 5/232* (2006.01)

(52) U.S. Cl.
CPC ....... *H04N 5/23212* (2013.01); *H04N 5/23296* (2013.01)
USPC ............................ 348/347; 348/345; 348/349

(58) Field of Classification Search
USPC .................. 348/240.99–240.3, 345, 347, 351
See application file for complete search history.

(56) References Cited

U.S. PATENT DOCUMENTS

| | | | | |
|---|---|---|---|---|
| 4,558,367 A | * | 12/1985 | Urata et al. .................... | 348/350 |
| 5,101,278 A | * | 3/1992 | Itsumi et al. ................... | 348/357 |
| 5,402,174 A | * | 3/1995 | Takahashi ..................... | 348/347 |
| 5,416,519 A | * | 5/1995 | Ohtake ......................... | 348/351 |
| 5,854,711 A | * | 12/1998 | Kaneda ......................... | 359/697 |
| 2002/0080242 A1 | * | 6/2002 | Takahashi et al. ............. | 348/208 |
| 2004/0201773 A1 | * | 10/2004 | Ostergard ...................... | 348/374 |
| 2011/0001870 A1 | * | 1/2011 | Yamamoto ..................... | 348/351 |

FOREIGN PATENT DOCUMENTS

| | | |
|---|---|---|
| JP | 06-339054 A | 12/1994 |
| JP | 08-220414 A | 8/1996 |
| JP | 11-183775 A | 7/1999 |

OTHER PUBLICATIONS

Japanese Office Action for corresponding JP2010-157795, mail date Jul. 8, 2014.

* cited by examiner

*Primary Examiner* — Twyler Haskins
*Assistant Examiner* — Dwight C Tejano
(74) *Attorney, Agent, or Firm* — Rossi, Kimms & McDowell LLP

(57) ABSTRACT

The image pickup apparatus includes a memory storing first tracking data indicating a positional relationship of a magnification-varying lens and a correction lens and second tracking data indicating a positional relationship of the magnification-varying lens and an image sensor. A controller moves the correction lens and the image sensor using the first and second tracking data. An in-focus position detector detects an in-focus position using an output from the image sensor. A tracking adjuster obtains an adjustment value for adjusting the first tracking data, by using a difference between the detected in-focus position in a state where the magnification-varying lens is located at a first zoom position and the image sensor is located at a position in the second tracking data corresponding to the first zoom position and a position of the correction lens in the first tracking data corresponding to the first zoom position.

8 Claims, 9 Drawing Sheets

TRACKING CONTROLLABLE IMAGE PICKUP APPARATUS

BACKGROUND OF THE INVENTION

1. Field of the Invention

The present invention relates to an image pickup apparatus capable of performing tracking control, such as a video camera and a digital still camera.

2. Description of the Related Art

Many inner focus type image pickup apparatuses can perform tracking control that moves a correction lens group such as a focus lens group to correct image plane variation caused due to variation of magnification performed by moving a magnification-varying lens group. The tracking control enables zooming, that is, variation of magnification with keeping an in-focus state. The tracking control performs position control of the correction lens group in response to the movement of the magnification-varying lens group by using tracking data indicating a positional relationship of the magnification-varying lens group and the correction lens group, the tracking data being prestored in a memory.

However, even if the position control of the correction lens group is performed according to the tracking data, defocusing may be caused due to errors in shape and dimension of each lens group and an attachment error of an image sensor such as a CCD sensor for photoelectrically converting an object image.

Japanese Patent Laid-Open No. 8-220414 discloses an image pickup apparatus that acquires positions of the correction lens group optimum for positions of the magnification-varying lens group where defocusing can be reduced, and thereby performs adjustment of the tracking data (hereinafter referred to as "tracking adjustment"). Moreover, Japanese Patent Laid-Open No. 11-183775 discloses an image pickup apparatus that calculates a difference between ideal tracking data and actually measured tracking data, and performs tracking adjustment by using the difference as adjustment data.

Furthermore, some recent image pickup apparatuses can move the image sensor in an optical axis direction during the variation of magnification to achieve a higher magnification than that of the image pickup apparatus moving only the magnification-varying lens group while reducing an apparatus size. Such image pickup apparatuses perform the tracking control for the image sensor as well as for the correction lens group, and also need the tracking adjustment for the image sensor.

However, the necessity of the tracking adjustment for the image sensor in addition to that for the correction lens group makes the tracking adjustment in the entire image pickup apparatus complex.

SUMMARY OF THE INVENTION

The present invention provides an image pickup apparatus that performs the tracking control of the correction lens group and the image sensor during the variation of magnification, and that is capable of easily performing the tracking adjustment.

The present invention provides as one aspect thereof an image pickup apparatus including a magnification-varying lens group that is moved in an optical axis direction to perform variation of magnification, a correction lens group that is moved in the optical axis direction during the variation of magnification to correct image plane variation caused due to the variation of magnification, an image sensor that photoelectrically converts an optical image formed by light passing through the magnification-varying lens group and the correction lens group, and is moved in the optical axis direction during the variation of magnification, a memory that stores first tracking data indicating a positional relationship of the magnification-varying lens group and the correction lens group, and stores second tracking data indicating a positional relationship of the magnification-varying lens group and the image sensor, a controller that is configured to move the correction lens group and the image sensor by using the first tracking data and the second tracking data, with the movement of the magnification-varying lens group, an in-focus position detector that is configured to detect an in-focus position of the correction lens group by using an output from the image sensor, and a tracking adjuster that is configured to obtain an adjustment value to be used for adjusting the first tracking data, by using a difference between the in-focus position detected through the in-focus position detector in a state where the magnification-varying lens group is located at a first zoom position and the image sensor is located at a position in the second tracking data corresponding to the first zoom position and a position of the correction lens group in the first tracking data corresponding to the first zoom position.

Further features of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

Embodiment 1

Figure 1:
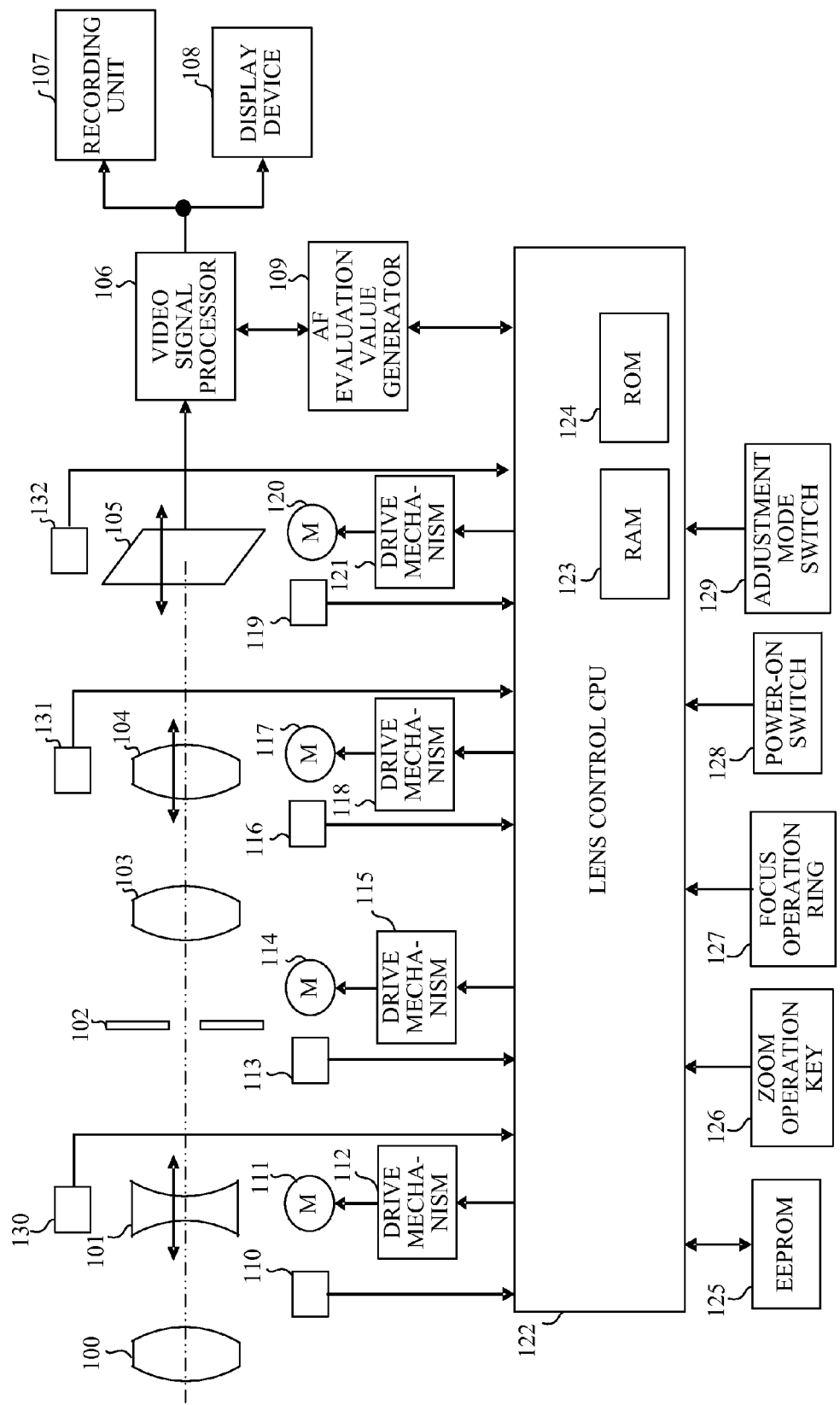
FIG. 1 is a block diagram showing the configuration of an image pickup apparatus that is Embodiment 1 of the present invention.

FIG. 1 shows the configuration of an image pickup apparatus that is a first embodiment (Embodiment 1) of the present invention. In order from an object side (left side in FIG. 1) to an image side, reference numeral 100 denotes a fixed front lens group, reference numeral 101 denotes a zoom lens group (magnification-varying lens group) that is moved in an optical axis direction to perform variation of magnification, and reference numeral 103 denotes a fixed afocal lens group. Moreover, reference numeral 104 denotes a focus lens group (correction lens group) that is moved in the optical axis direction to perform focusing and correction (or reduction) of image plane variation caused due to the variation of magnification. Correcting the image plane variation caused due to the variation of magnification enables zooming that is the variation of magnification with keeping an in-focus state. Reference numeral 102 denotes an aperture stop unit that adjusts an amount of light. These lens groups 100, 101, 103 and 104 and the aperture stop unit 102 constitute an image taking optical system.

Reference numeral 105 denotes an image sensor that is a photoelectric conversion element such as a CCD sensor or a CMOS sensor. The image sensor 105 photoelectrically converts an optical image (object image) formed by light passing through the image taking optical system (that is, through the zoom lens group 101 and the focus lens group 104). During the variation of magnification, the image sensor 105 is moved in the optical axis direction by an image sensor drive mechanism, which will be described later.

An image pickup signal that is an analog signal and output from the image sensor 105 is converted into a digital image pickup signal by an A/D conversion function of a video signal processor 106. The video signal processor 106 performs various image processing such as amplification processing and gamma correction on the digital image pickup signal to produce a video signal. The video signal is displayed on a display device 108 such as an organic EL panel or a liquid crystal display panel, and recorded through a recording unit 107 in a recording medium such as a magnetic tape or a semiconductor memory.

Reference numerals 111, 117 and 120 denote a zoom drive mechanism, a focus drive mechanism and the above-described image sensor drive mechanism that move the zoom lens group 101, the focus lens group 104 and the image sensor 105 in the optical axis direction, respectively. Each of these drive mechanisms includes a motor as a driving source, such as a stepping motor, a vibration type motor or a voice coil motor.

Reference numeral 114 denotes an aperture stop drive mechanism that drives the aperture stop unit 102 and includes a motor as a driving source such as a stepping motor. The drive of each motor is controlled by a lens control CPU 122 as a controller. The lens control CPU 122 also serves as a tracking adjuster.

The lens control CPU 122 detects positions of the zoom lens group 101, the focus lens group 104 and the image sensor 105 in the optical axis direction through a zoom position detector 110, a focus position detector 116 and an image sensor position detector 119, respectively.

As the zoom position detector 110, the focus position detector 116 and the image sensor position detector 119, optical sensors or magnetic sensors are used each of which produces a pulse signal for each predetermined amount movement of each of the zoom lens group 101, the focus lens group 104 and the image sensor 105. The lens control CPU 122 detects a position of the aperture stop unit 102 in its open and close directions (that is, an aperture value) through an aperture stop position detector 113 constituted by a hall element or the like.

Reference numerals 130, 131 and 132 denote a zoom origin detector, a focus origin detector and an image sensor origin detector which detect that the zoom lens group 101, the focus lens group 104 and the image sensor 105 are located at their reference positions (that is, their origins) in the optical axis direction. Each of these origin detectors 130, 131 and 132 is constituted by a photo interrupter.

For example, in the zoom origin detector 130, entrance of a light-blocking portion formed on a lens holding member that holds the zoom lens group 101 into a gap between a light emitting part and a light receiving part of the zoom origin detector 130 blocks light emitted from the light emitting part from reaching the light receiving part, which stops output of signals from the light receiving part. The lens control CPU 122 detects that the zoom lens group 101 is located at the origin in response to this stoppage of the signal output. Then, the lens control CPU 122 resets its internal counter in response to the origin detection, and counts by the internal counter a number of the pulse signals produced corresponding to the movement amount of the zoom lens group 101 by the zoom position detector 110. Thus, the lens control CPU 122 detects from the counted pulse number a movement amount (that is, the position) of the zoom lens group 101 from its origin.

As the zoom position detector 110, a potentiometer may be used which outputs a signal having a value corresponding to the position of the zoom lens group 101. In this case, the zoom origin detector 130 is unnecessary.

The above-described position detection method also applies to position detection for the focus lens group 104 using the focus origin detector 131 and the focus position detector 116 and position detection for the image sensor 105 using the image sensor origin detector 132 and the image sensor position detector 119.

Reference numerals 112, 115, 118 and 121 denote drivers that drive, in response to control signals from the lens control CPU 122, the motors in the zoom drive mechanism 111, the focus drive mechanism 114, the image sensor drive mechanism 117 and the aperture stop drive mechanism 120, respectively.

Reference numeral 123 denotes a RAM as a memory that is provided in the lens control CPU 122 and stores various data. Reference numeral 124 denotes a ROM as a memory that is also provided in the lens control CPU 122 and stores computer programs and various setting values.

Reference numeral 125 denotes an EEPROM as a memory that stores tracking curves and tracking adjustment value, which will be described later. The tracking curves may be stored in the ROM 124 capable of reading data at a high speed.

Reference numeral 126 denotes a zoom operation key that is operated by a user to instruct the zooming. In response to the user's operation of the zoom operation key 126, the lens control CPU 122 controls the motor in the zoom drive mechanism 111 to move the zoom lens group 101. During the zooming (that is, during the variation of magnification), the lens control CPU 122 controls the motors in the focus drive mechanism 114 and the image sensor drive mechanism 117 by using the tracking curves and the tracking adjustment values stored in the EEPROM 125 to move the focus lens group 104 and the image sensor 105. That is, the lens control CPU 122 performs tracking control that enables the zooming, in other words, the variation of magnification with keeping an in-focus state.

Reference numeral 109 denotes an AF evaluation value generator that produces, from the video signal output from the video signal processor 106, an AF evaluation value as contrast information showing a contrast state of the video signal (video image). The lens control CPU 122 as an in-focus position detector moves the focus lens group 104 to a position (in-focus position) where the AF evaluation value becomes maximum to perform auto focus (AF).

Reference numeral 127 denotes a focus operation ring that is operated by the user to instruct manual focus. Turning the power of the image pickup apparatus on and off is performed in response to operations of a power-on switch 128. Reference numeral 129 denotes an adjustment mode switch to set an operation mode of the image pickup apparatus to an adjustment mode when tracking adjustment, which will be described later, is performed.

Figure 2:
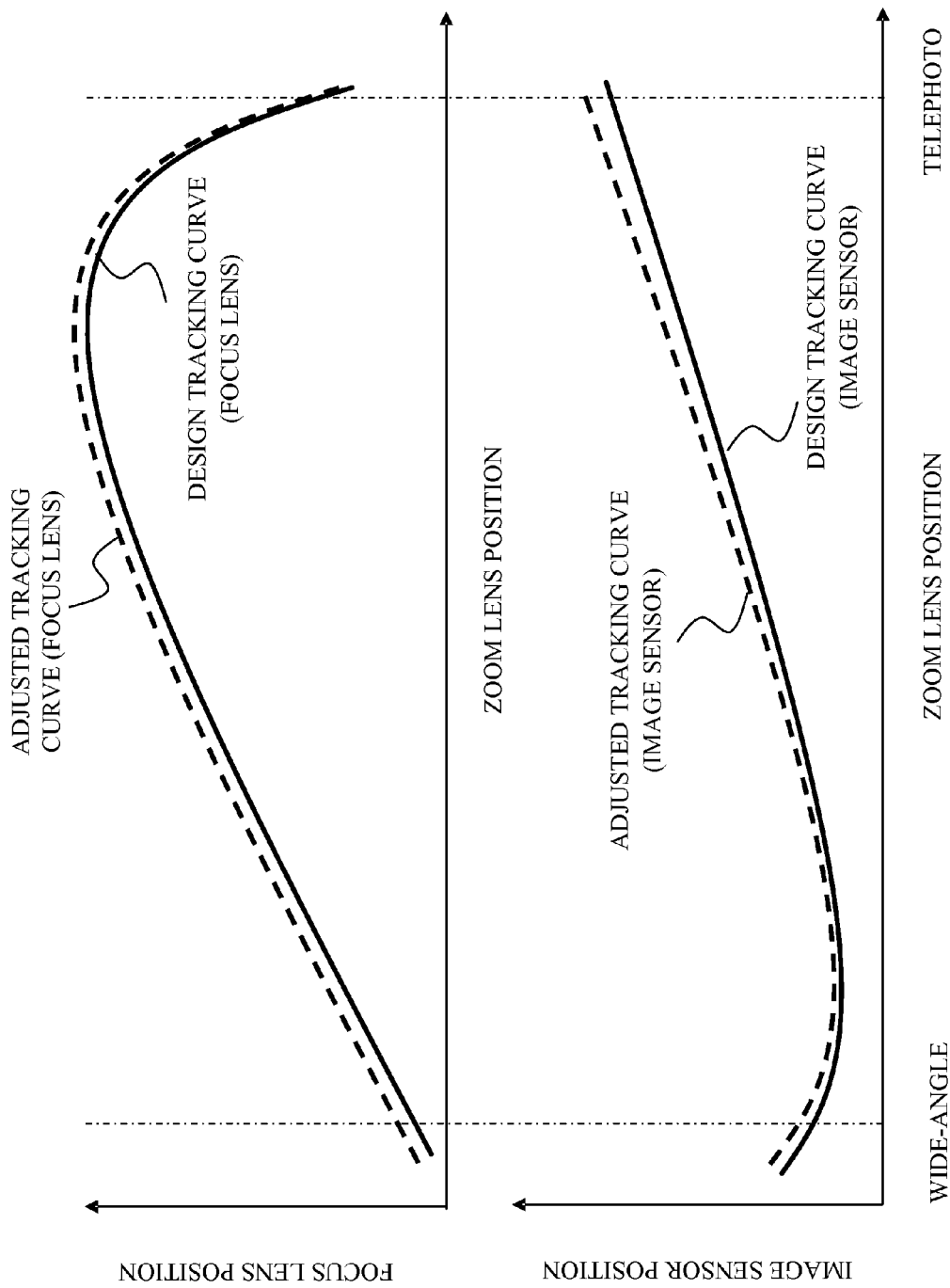
FIG. 2 shows tracking curves to be used in the image pickup apparatus of Embodiment 1.

An upper part of FIG. 2 illustrates an example of zoom-focus tracking data as first tracking data that shows a relationship of the position of the zoom lens group 101 (hereinafter referred to as a "zoom lens position") and the position of the focus lens group 104 (hereinafter referred to as a "focus lens position"). Moreover, a lower part of FIG. 2 illustrates an example of zoom-image sensor tracking data as second tracking data that shows a relationship of the zoom lens position and the position of the image sensor 105 (hereinafter referred to as an "image sensor position"). Although each tracking data is actually composed of finite plural point data, FIG. 2 shows each tracking data as a curved line connecting these point data. The tracking data is hereinafter referred to as a "tracking curve".

Moving the focus lens group 104 and the image sensor 105 according to their design tracking curves illustrated by solid lines should keep the in-focus state. The design tracking curves herein are theoretical ones obtained by numerical calculation on the assumption that a manufacturing error of the image pickup apparatus is 0. However, the image pickup apparatus actually includes manufacturing errors. Therefore, it is often impossible to keep the in-focus state without using a tracking curve adjusted according to the manufacturing error as shown by dotted lines. The tracking curve adjusted according to the manufacturing error corresponds to adjusted tracking data and is hereinafter referred to as "adjusted tracking curve".

Although FIG. 2 shows the tracking curves for the zoom lens positions shown along a horizontal axis, similar tracking curves can be drawn for focal lengths of the image taking optical system. The zoom lens position, the focus lens position and the image sensor position for the tracking curves mean positions obtained by the position detectors 110, 116 and 119 and the origin detectors 130, 131 and 132.

Description will hereinafter be made of tracking adjustment that adjusts the tracking curve with reference to FIGS. 3 and 4.

Figure 3:
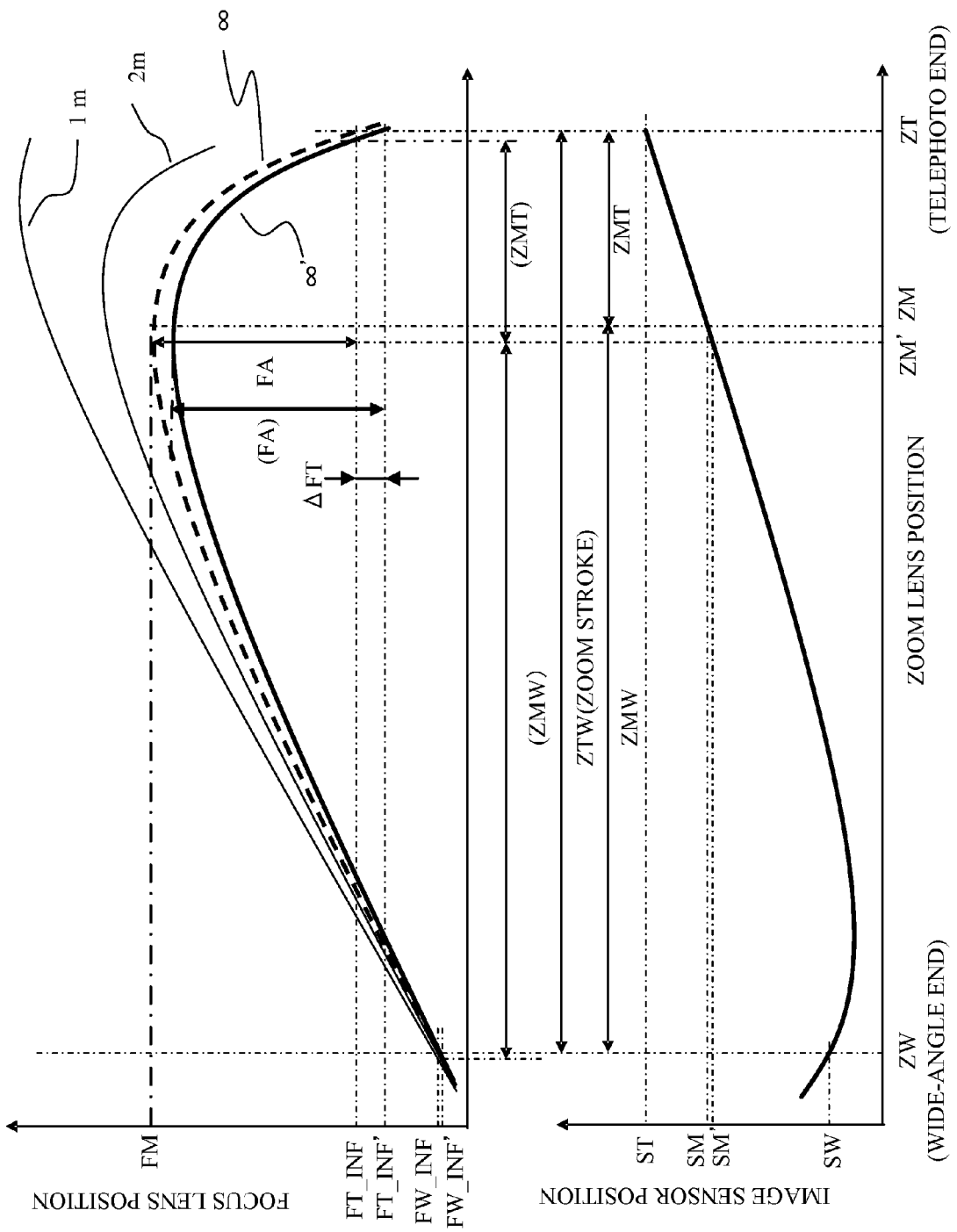
FIG. 3 shows tracking adjustment performed in the image pickup apparatus of Embodiment 1.

An upper part of FIG. 3 shows design zoom-focus tracking curves (solid lines) 1 m, 2 m and ∞' for object distances (1 m, 2 m and an infinitely far distance) and an adjusted zoom-focus tracking curve (dotted line) for the infinitely far object distance. A lower part of FIG. 3 shows a design zoom-image sensor tracking curve (solid line) that is common to all object distances.

Figure 4:
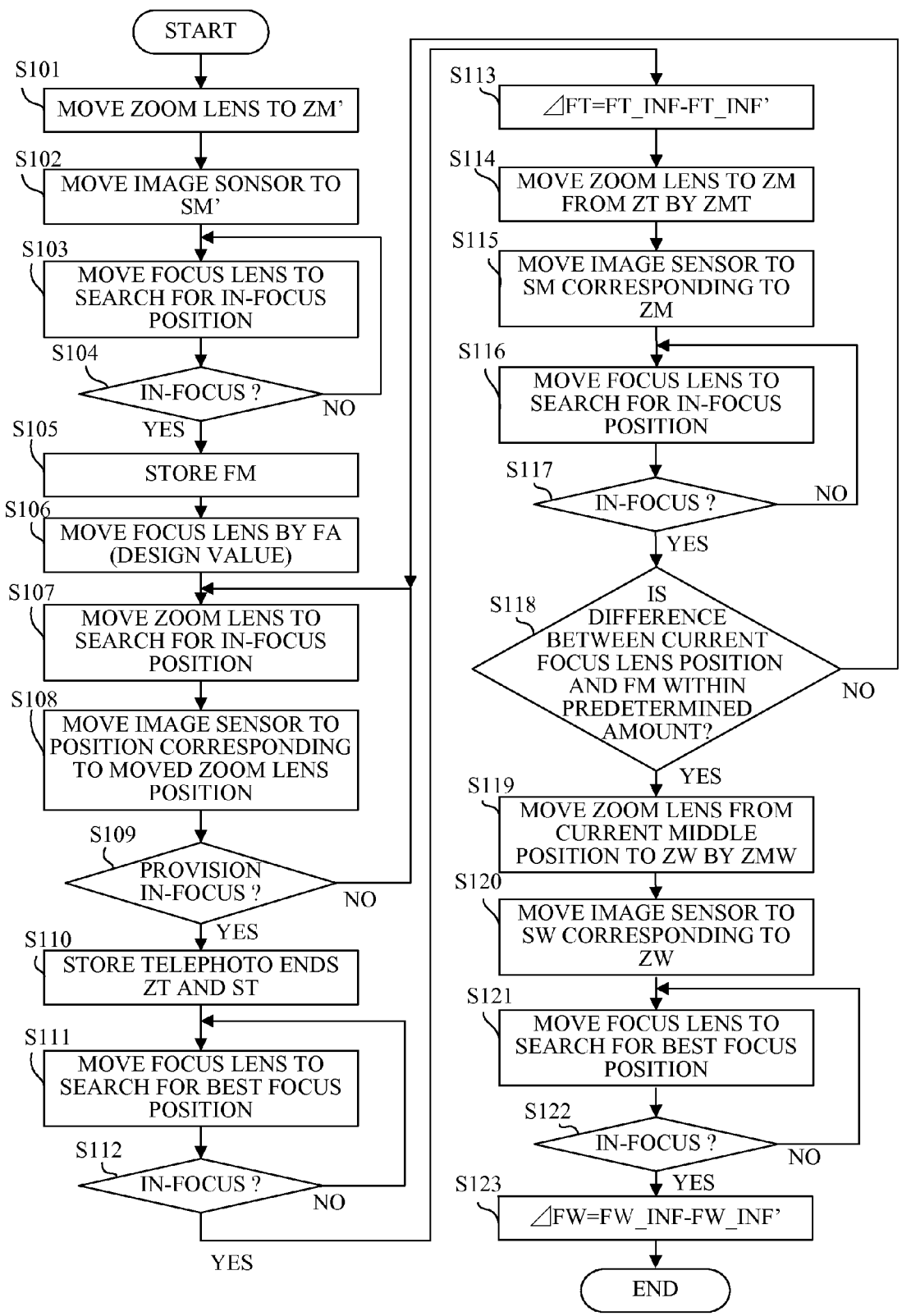
FIG. 4 is a flowchart showing processes in the tracking adjustment (at a telephoto end and a wide-angle end) performed by the image pickup apparatus of Embodiment 1.

FIG. 4 is a flowchart showing operations (processes) performed by the lens control CPU 122 in the tracking adjustment. Description will herein be made of a case where the tracking curve for the infinitely far object distance is adjusted by using a collimator. It is desirable that a chart captured by the image pickup apparatus in order to obtain the AF evaluation value in the tracking adjustment be one that facilitates production of the AF evaluation value, such as a chart including a black and white radial pattern. The aperture stop is set to a fully-opened state in order to reduce an influence of depth of field.

At step S101, the lens control CPU 122 moves the zoom lens group 101 to a provisional specific middle position ZM' that is a position on the design zoom-focus tracking curve shown in FIG. 3. The provisional specific middle position corresponds to an inflection point of the design zoom-focus tracking curve, the inflexion point being a point that a tangent thereat has a slope of 0.

Next at step S102, the lens control CPU 122 moves the image sensor 105 to a position SM' corresponding to the provisional specific middle position ZM' of the zoom lens group 101. The position SM' is decided from the design zoom-image sensor tracking curve.

Next at steps S103 and S104, the lens control CPU 122 moves the focus lens group 104 in a close distance direction or an infinitely far distance direction to search for (that is, detect) an in-focus position of the focus lens group 104 where the AF evaluation value becomes maximum.

When the in-focus position is detected at step S104, the lens control CPU 122 at step S105 stores the in-focus position of the focus lens group 104 as FM to the RAM 123 (or the EEPROM 125).

Next at step S106, the lens control CPU 122 moves the focus lens group 104 by a movement amount FA as a design value shown in FIG. 3. The movement amount FA corresponds to a difference between the focus lens position on the design zoom-focus tracking curve corresponding to the provisional specific middle position ZM' and a focus lens position (design focus lens position) FT_INF' thereon corresponding to a telephoto end.

Next at step S107, the lens control CPU 122 searches for a position where the AF evaluation value becomes maximum with movement of the zoom lens group 101 in a telephoto direction or a wide-angle direction.

Next at step S108, the lens control CPU 122 moves the image sensor 105 to a position (design value) corresponding to the position of the zoom lens group 101 that has been moved at step S107 in synchronization with the movement of the zoom lens group 101 in the telephoto direction or the wide-angle direction.

Then, the lens control CPU 122 repeats the processes at steps S107 and S108 until determining that the in-focus position has been detected at step S109. The in-focus position herein is an in-focus position obtained by using the movement of the zoom lens group 101, and therefore a provisional in-focus position.

Obtaining the AF evaluation value and making the in-focus determination after the movement of the zoom lens group 101 and the image sensor 105 enable improvement of accuracy of the determination. When detecting the in-focus position, the lens control CPU 122 proceeds to step S110.

At step S110, the lens control CPU 122 stores to the EEPROM 125 a zoom lens position ZT and an image sensor position ST when the provisional in-focus position has been detected at step S109, as a zoom lens position and an image sensor position at the telephoto end.

Next at step S111, the lens control CPU 122 searches for a true in-focus position (best focus position) where the AF evaluation value becomes maximum with movement of the focus lens group 104 from the provisional in-focus position.

Then at step S112, the lens control CPU 122 determines whether or not the true in-focus position has been detected. If determining that the true in-focus position has been detected, the lens control CPU 122 proceeds to step S113. If determining that the true in-focus position has not been detected, the lens control CPU 122 repeats the search of the true in-focus position.

At step S113, the lens control CPU 122 calculates a difference ΔFT between the true in-focus position FT_INF and the design in-focus position FT_INF' for the telephoto end and the infinitely far object distance, and then stores the difference ΔFT to the EEPROM 125.

The true in-focus position FT_INF may be stored in the EEPROM 125 instead of the difference ΔFT. However, since a dynamic range can be narrower in the case of storing the difference ΔFT than in the case of storing the focus lens position FT_INF, it is possible to reduce a memory capacity of the EEPROM 125. In image capturing, this stored difference ΔFT is used as a tracking adjustment value for the focus lens group 104 at the telephoto end.

At step S114, the lens control CPU 122 moves the zoom lens group 101 from the telephoto end ZT decided at step S110 to a zoom lens position ZM in the wide-angle direction by a stroke ZMT between the telephoto end and the specific middle position, which is obtained as a design stroke.

Next at step S115, the lens control CPU 122 moves the image sensor 105 to a position SM corresponding to the zoom lens position ZM to which the zoom lens group 101 has been moved at step S114.

Then at step S116, the lens control CPU 122 searches for an in-focus position where the AF evaluation value becomes maximum with movement of the focus lens group 104 at the specific middle position. The lens control CPU 122 repeats the process at step S116 until determining that the in-focus position has been detected at step S117. The lens control CPU 122 proceeds to step S118 when determining that the in-focus position has been detected at step S117.

At step S118, the lens control CPU 122 calculates a difference ΔFM between the focus lens position that has been determined as the in-focus position at step S117 and the in-focus position FM of the focus lens group 104 obtained at step S105. Then, the lens control CPU 122 determines whether or not the difference ΔFM is within a predetermined amount. Normally a slope of the zoom-focus tracking curve is 0 near the inflexion point thereof, so that the movement of the focus lens group 104 with respect to the movement of the zoom lens group 101 is minute. Thus, the difference ΔFM larger than the predetermined amount shows that any abnormal situation may be generated, so that the lens control CPU 112 performs the processes from step S107 again. If the difference ΔFM is within the predetermined amount, the lens control CPU 122 proceeds to step S119.

At step S119, the lens control CPU 122 moves the zoom lens group 101 from the specific middle position ZM that is a current zoom lens position in the wide-angle direction by a stroke ZMW between the specific middle position and a wide-angle end, which is obtained as a design stroke. Then, the lens control CPU 122 stores the zoom lens position after that movement to the EEPROM 125 as a wide-angle end ZW of the zoom lens group 101. A zoom range in which the zooming is actually performed in response to the user's operation of the zoom operation key 126 is a range between the wide-angle end ZW stored at this step and the telephoto end ZT stored at step S110.

Next at step S120, the lens control CPU 122 moves the image sensor 105 to a position SW corresponding to the zoom lens position (wide-angle end) where the zoom lens group 101 has been moved at step S119, and stores the image sensor position after that movement to the EEPROM 125 as a wide-angle end SW of the image sensor 105.

Next at step S121, the lens control CPU 122 searches for, in the state where the zoom lens group 101 is located at the wide-angle end, an in-focus position (best focus position) where the AF evaluation value becomes maximum with movement of the focus lens group 104. The lens control CPU 122 repeats the process at step S121 until determining that the in-focus position has been detected at step S122. The lens control CPU 122 proceeds to step S123 when determining that the in-focus position has been detected at step S122.

At step S123, the lens control CPU 122 calculates a difference ΔFW between a position FW_INF where the in-focus state is actually obtained and the design in-focus position FW_INF' for the wide-angle end and the infinitely far object distance, and then stores the difference ΔFW to the EEPROM 125. In image capturing, this stored difference ΔFW is used as a tracking adjustment value for the focus lens group 104 at the wide-angle end. Thus, the lens control CPU 112 ends the processes.

The above-described tracking adjustment enables acquisition of the telephoto ends ZT and ST and the wide-angle ends ZW and SW of the zoom lens group 101 and the image sensor 105, and the tracking adjustment values ΔFT and ΔFW for the focus lens group 104 at these zoom lens positions (first zoom positions) ZT and ZW.

Moreover, adjusting the entire design zoom-focus tracking curve by using the differences ΔFT and ΔFW, that is, shifting the entire design zoom-focus tracking curve according to the differences ΔFT and ΔFW enables acquisition of the adjusted zoom-focus tracking curve. Performing the tracking control of the focus lens group 104 by using the adjusted zoom-focus tracking curve enables, in the image pickup apparatus that moves during zooming the image sensor 105 in the optical axis direction, the zooming with keeping the in-focus state regardless of the apparatus manufacturing errors.

While the description has been made of the case of performing the tracking adjustment for the infinitely far object distance, tracking adjustment for finite object distances can be performed similarly thereto.

Moreover, when the zoom-focus tracking curve has plural inflexion points, it is desirable that one inflexion point closest to the telephoto end be selected as a specific middle position. This is because each of differences among the in-focus positions for different object distances increases as the zoom lens position becomes closer to the telephoto end, and therefore in-focus position detection accuracy increases. In addition, this is because, as described with reference to FIG. 4, since the movement of the zoom lens group 101 and the image sensor 105 between the telephoto end and the specific middle position is repeated, a shorter time required for the movement can shorten a time required for the tracking adjustment.

The tracking adjustment described with reference to FIG. 4 produces the adjusted zoom-focus tracking curve so as to be able to obtain the in-focus states at the telephoto end, the specific middle position and the wide-angle end. However, there is a case where the in-focus state cannot be obtained at a zoom lens position (second zoom position, and hereinafter referred to as an "intermediate zoom lens position") different from the telephoto end, the specific middle position and the wide-angle end even if the focus lens group 104 is moved according to the adjusted zoom-focus tracking curve.

Figure 6:
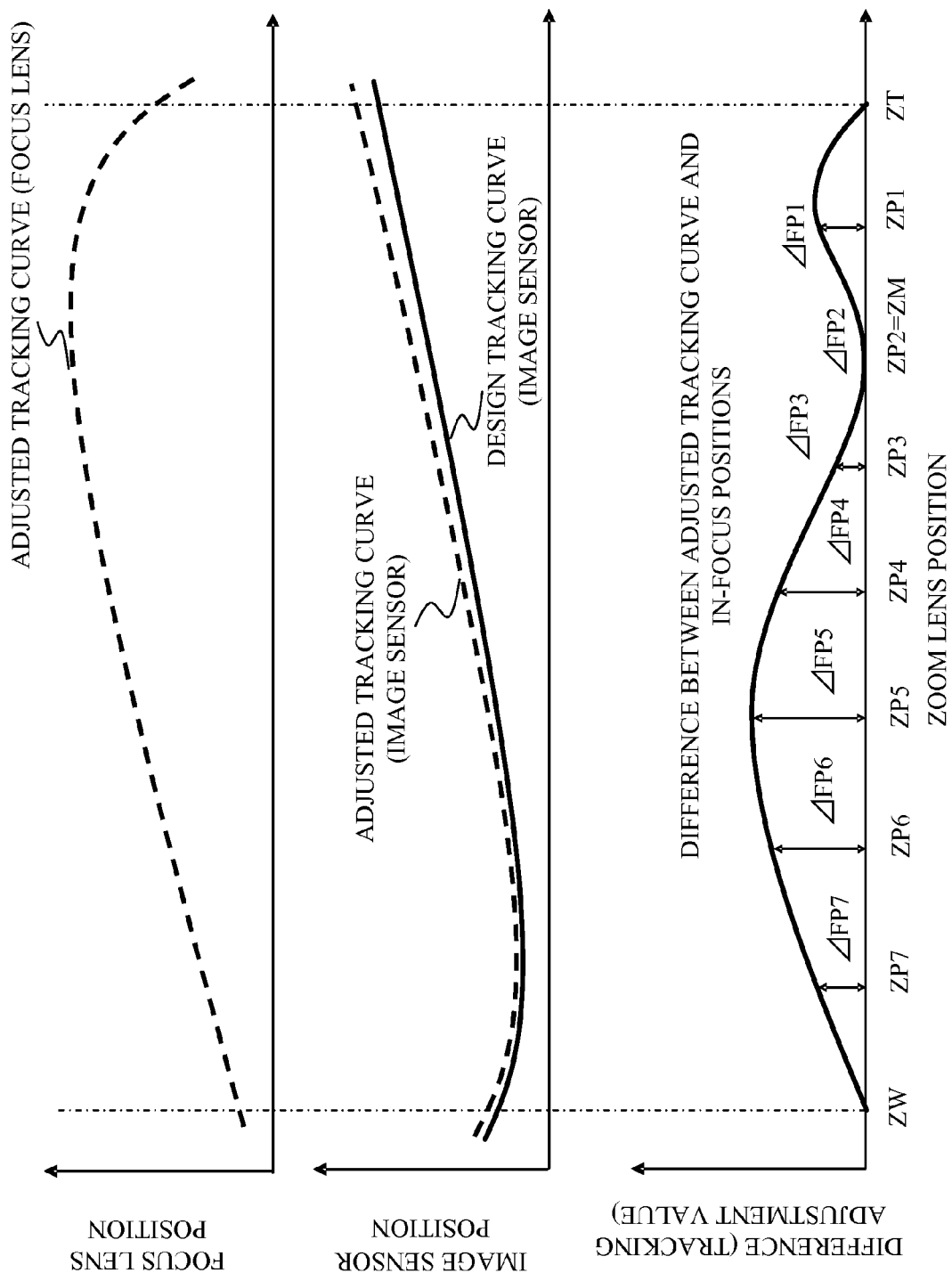
FIG. 6 shows adjusted tracking curves and tracking adjustment values in Embodiment 1.

An upper part of FIG. 6 shows the adjusted zoom-focus tracking curve obtained by the tracking adjustment shown in FIG. 4 by a dotted line. A middle part thereof shows the design zoom-image sensor tracking curve by a solid line. Moreover, a lower part thereof shows differences between the adjusted zoom-focus tracking curve and actual in-focus positions for the respective zoom lens positions.

When the tracking control is performed using the telephoto end ZT, the wide-angle end ZW and the tracking adjustment values ΔFT and ΔFW thereat shown in FIG. 4, the differences between the adjusted zoom-focus tracking curve and the actual in-focus positions at the telephoto end ZT, the specific middle position ZP2(=ZM) and the wide-angle end ZW are approximately 0, as shown in the lower part of FIG. 6.

However, at the intermediate zoom lens position, a difference (error) of the actual position of the image sensor 105 with respect to the design zoom-image sensor tracking curve, which is shown as an "adjusted tracking curve (image sensor)" by a dotted line, may shift an actual in-focus position from a position (adjusted position) on the adjusted zoom-focus tracking curve. Thus, it is necessary for reducing such shift to obtain a correction value for the adjusted zoom-focus tracking curve at the intermediate zoom lens position. In other words, correcting the adjusted position of the focus lens group 104 so as to correct the positional error of the image sensor 105 enables the zooming with keeping the in-focus state also at the intermediate zoom lens position.

Figure 5:
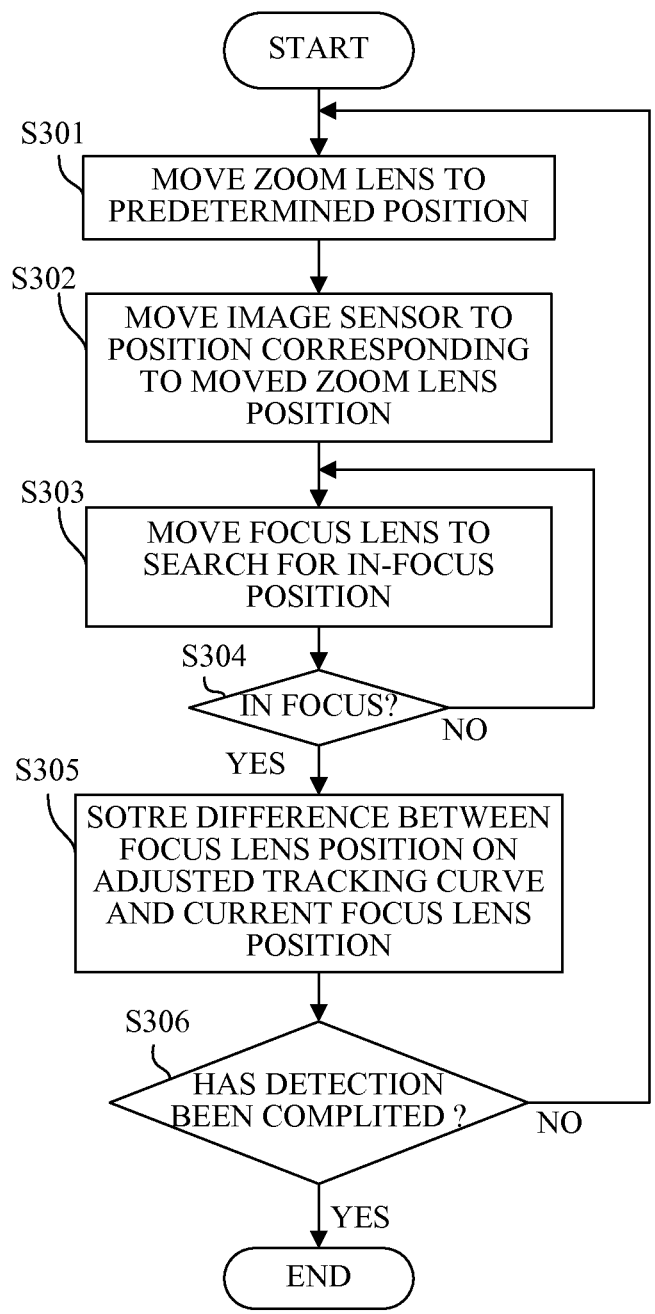
FIG. 5 is a flowchart showing processes in the tracking adjustment (at an intermediate zoom position) performed by the image pickup apparatus of Embodiment 1.

FIG. 5 is a flowchart showing operations (processes) that the lens control CPU 122 performs to obtain (detect) the correction value at plural intermediate zoom lens positions.

At step S301, the lens control CPU 122 moves the zoom lens group 101 to any one of predetermined intermediate zoom lens positions ZP1 to ZP7. For example, in a case of detecting the correction values in order from a telephoto side, the lens control CPU 122 moves the zoom lens group 101 to the intermediate zoom lens position ZP1. The lens control CPU 122 may detect the correction values again at the telephoto end ZT, the specific middle position ZM and the wide-angle end ZW where the correction value should be 0. Too many intermediate zoom lens positions where the correction values are detected increase a time required for detecting the correction values at all the intermediate zoom lens positions. Therefore, it is desirable to adequately set the number of the intermediate zoom lens positions (in other words, intervals among the respective intermediate zoom lens positions) in consideration of manufacturing errors of the image pickup apparatus and a required depth of field.

Next at step S302, the lens control CPU 122 moves the image sensor 105 according to the design zoom-image sensor tracking curve to a position corresponding to the zoom lens position where the zoom lens group 101 has been moved at step S301.

Next at step S303, the lens control CPU 122 moves the focus lens group 104 in the close distance direction or the infinitely far distance direction to search for a focus lens position (actual in-focus position) where the AF evaluation value becomes maximum. The lens control CPU 122 repeats the process at step S303 until determining that the in-focus position has been detected at step S304. The lens control CPU 122 proceeds to step S305 when determining that the in-focus position has been detected at step S304.

At step S305, the lens control CPU 122 stores, as the correction value, a difference between the actual in-focus position determined at step S304 and the focus lens position (adjusted position) according to the adjusted zoom-focus tracking curve to the EEPROM 125. For example, when the zoom lens position is ZP1, the difference ΔFP1 is obtained as the correction value at ZP1. The correction value becomes a positive value or a negative value depending on a positional relationship of the actual in-focus position and the focus lens position (adjusted position) according to the adjusted zoom-focus tracking curve.

Moreover, a difference between the actual in-focus position and the focus lens position according to the design zoom-focus tracking curve may be stored as the correction value to the EEPROM 125. Obtaining this correction value means, as a result, obtaining the correction value for the adjusted position.

Then at step S306, the lens control CPU 122 determines whether or not the correction values at all the predetermined intermediate zoom lens positions have been detected. If at least one of the predetermined intermediate zoom lens positions where the correction value should be detected remains, the lens control CPU 122 returns to step S301 to detect the correction value at the next intermediate zoom lens position. If the correction values at all the predetermined intermediate zoom lens positions have been detected, the lens control CPU 122 ends the processes.

It is desirable that the above-described tracking adjustment and the correction value detection be performed in a manufacturing process of the image pickup apparatus. However, they may be performed by a user before use of the image pickup apparatus.

Next, description will be made of the tracking control of the focus lens group 104 in the image pickup apparatus of this embodiment with reference to FIG. 9. The tracking control of the image sensor 105 is performed similarly to that of the focus lens group 104.

Figure 9:
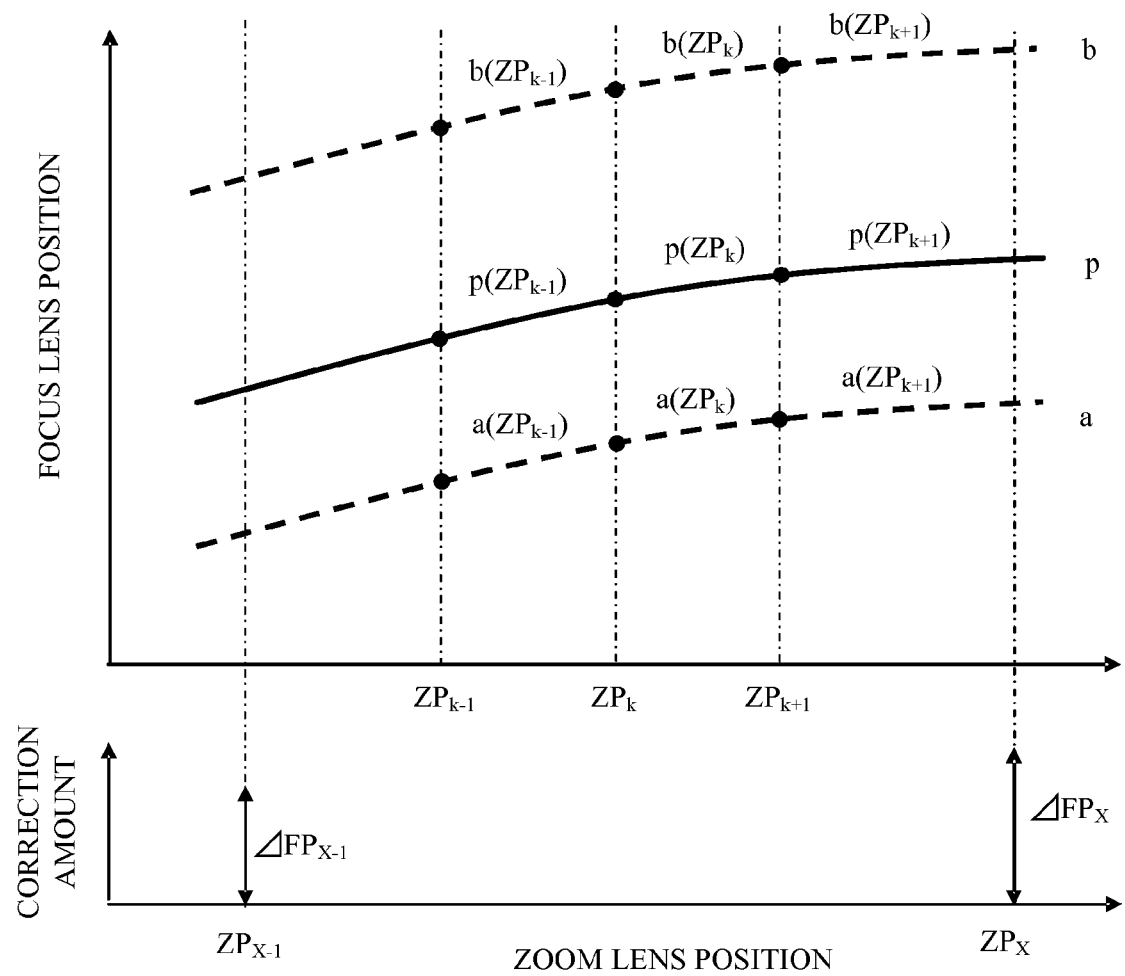
FIG. 9 shows an outline of tracking control performed in the image pickup apparatus of Embodiment 1.

A solid line p in FIG. 9 shows the zoom-focus tracking curve for an object distance Lp. Dotted lines a and b show the design zoom-focus tracking curves (hereinafter also simply referred to as "design tracking curves") for object distances La and Lb. The design tracking curves a and b are stored in the ROM 124 provided in the lens control CPU 122 as table data or calculating expressions.

A focus lens position $p(ZP_k)$ for a zoom lens position $ZP_k$ and the object distance Lp can be expressed by using a value (design value) on the design tracking curve, as follows:

$$p(ZP_k) = \alpha/\beta \times |b(ZP_k) - a(ZP_k)| + a(ZP_k)$$

where α represents a difference between the design tracking curve a and a tracking curve p for the object distance Lp, and β represents a difference between the design tracking curves a and b, which are expressed by the following expressions:

$$\alpha = |p(ZP_k) - a(ZP_k)|$$

$$\beta = |b(ZP_k) - a(ZP_k)|.$$

In addition, a focus lens position $fp(ZP_k)$ corrected by the tracking adjustment value and the correction value obtained by the processes shown in FIGS. 4 and 6 can be expressed by the following expression. The tracking adjustment value and the correction value are hereinafter collectively referred to as the correction value. In the following expression, $\Delta FP_{X-1}$ represents the correction value at the zoom lens position $ZP_{X-1}$, and $\Delta FP_X$ represents the correction value at the zoom lens position $ZP_X$.

$$fp(ZP_k) = (\Delta FP_{X-1} - \Delta FP_X) \times (p(ZP_k) - ZP_{X-1})/(ZP_{X-1} - ZP_X) + \Delta FP_{X-1} + p(ZP_k)$$

In other words, it is possible to obtain, by using the correction values for the focus lens positions at two zoom lens positions, the corrected focus lens position $fp(ZP_k)$ at an arbitrary zoom lens position between the two zoom lens positions.

The corrected focus lens positions thus calculated for the respective object distances and the respective zoom lens positions may be stored as table data in a memory such as an EEPROM, and one corrected focus lens position corresponding to the object distance and the zoom lens position in image capturing may be retrieved from the memory. However, this case may need a large memory capacity. Thus, only data of the design tracking curves and data of the correction values may be stored in the memory, and the lens control CPU 122 may obtain a position to which the focus lens group 104 is moved by using these data in image capturing.

Embodiment 2

Embodiment 1 has described the tracking adjustment in the case where the design zoom-focus tracking curve has the inflexion point at the specific middle position. In contrast thereto, a second embodiment (Embodiment 2) of the present invention will describe tracking adjustment in a case where the design zoom-focus tracking curve has no inflexion point. Components in Embodiment 2 common to those in Embodiment 1 are denoted by the same reference numerals as those in Embodiment 1.

Figure 7:
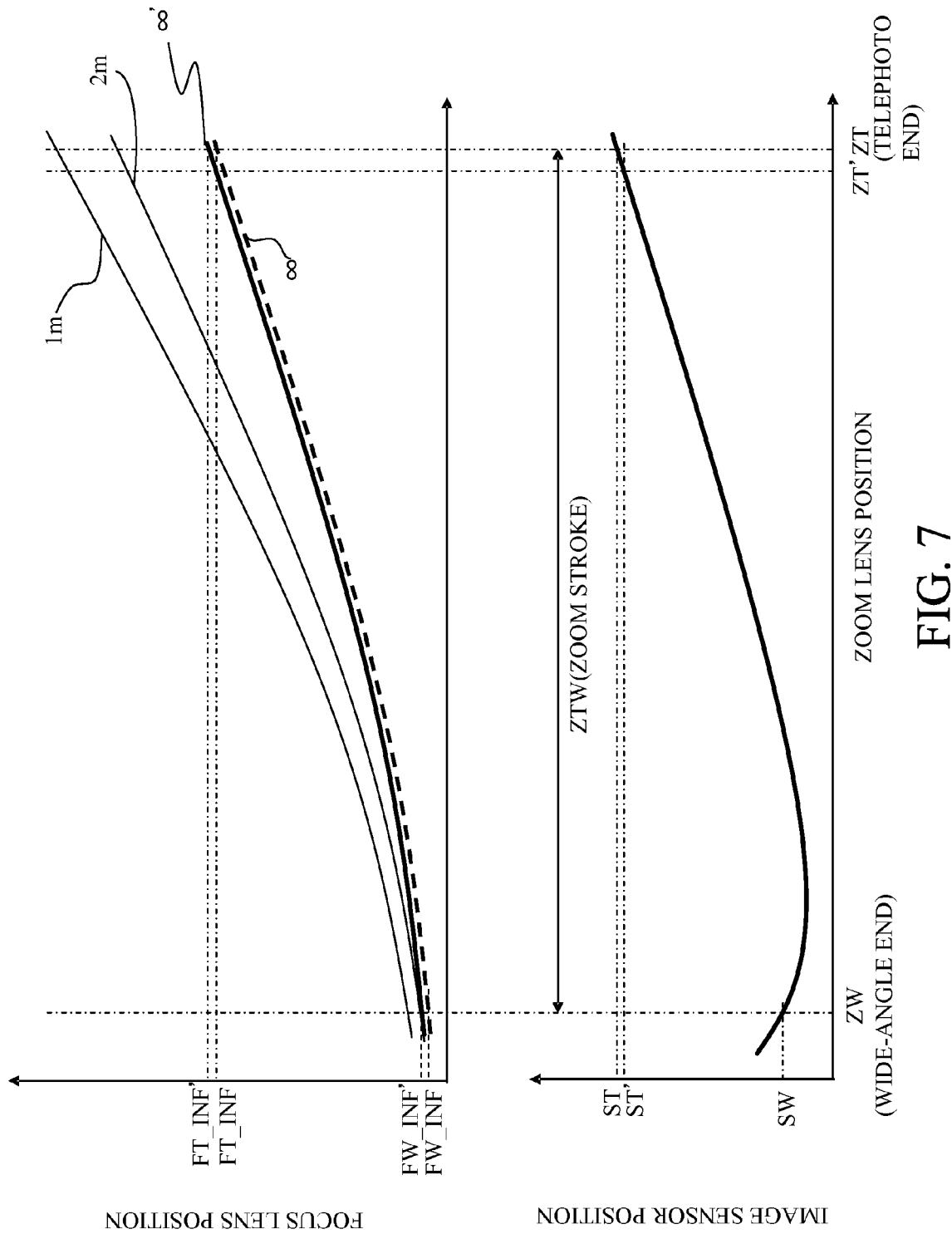
FIG. 7 shows tracking adjustment performed in an image pickup apparatus that is Embodiment 2 of the present invention.

An upper part of FIG. 7 shows design zoom-focus tracking curves (solid lines) 1 m, 2 m and ∞' for object distances (1 m, 2 m and an infinitely far distance) and an adjusted zoom-focus tracking curve (dotted line) for the infinitely far object distance. A lower part of FIG. 7 shows a design zoom-image sensor tracking curve (solid line) that is common to all object distances.

The design zoom-focus tracking curves shown in FIG. 7 have no inflexion point, which is different from those shown in FIG. 3. Therefore, Embodiment 2 performs the tracking adjustment at the telephoto end and the wide-angle end.

Figure 8:
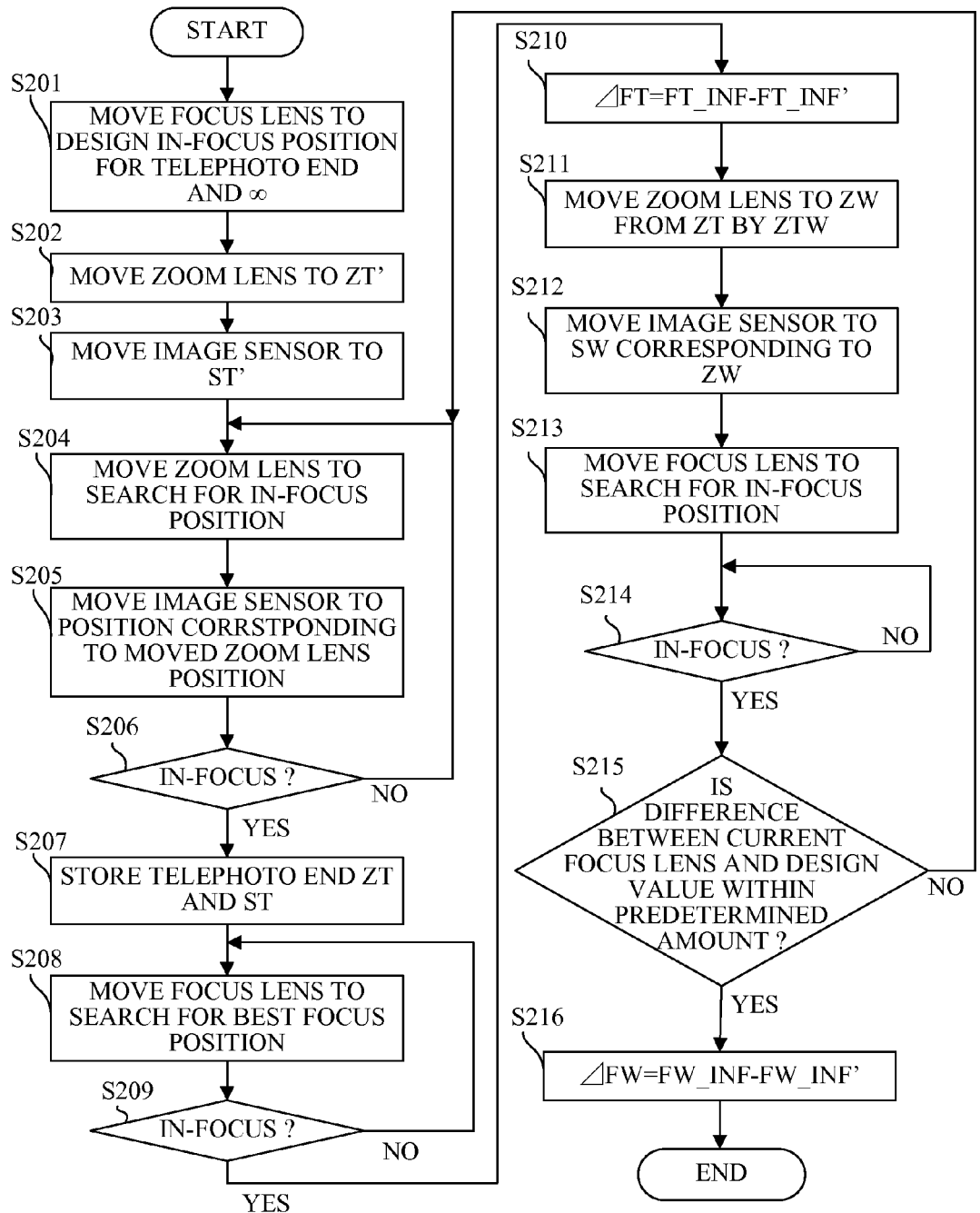
FIG. 8 is a flowchart showing processes in the tracking adjustment performed by the image pickup apparatus of Embodiment 2.

FIG. 8 is a flowchart showing operations (processes) performed by the lens control CPU 122 in the tracking adjustment in Embodiment 2. Also in Embodiment 2, description will be made of the case where the tracking curve for the infinitely far object distance is adjusted by using a collimator. Moreover, also in Embodiment 2, it is desirable that a chart captured by the image pickup apparatus in order to obtain the AF evaluation value in the tracking adjustment be one that facilitates production of the AF evaluation value, such as a chart including a black and white radial pattern, and the aperture stop is set to the fully-opened state in order to reduce the influence of depth of field.

At step S201, the lens control CPU 122 moves, as an initial operation, the focus lens group 104 to a design in-focus position for the telephoto end and the infinitely far object distance.

Next at step S202, the lens control CPU 122 moves the zoom lens group 101 to a provisional telephoto end (design telephoto end) ZT'.

Next at step S203, the lens control CPU 122 moves the image sensor 105 to a position ST' corresponding to the telephoto end ZT' to which the zoom lens group 101 has been moved at step S202.

Next at step S204, the lens control CPU 122 searches for an in-focus position where the AF evaluation value becomes maximum with movement of the zoom lens group 101 in the telephoto direction or the wide-angle direction.

In addition, at step S205, the lens control CPU 122 moves the image sensor 105 to a position (design value) corresponding to the position of the zoom lens group 101 that has been moved at step S204 in synchronization with the movement of the zoom lens group 101 in the telephoto direction or the wide-angle direction.

Then, the lens control CPU 122 repeats the processes at steps S204 and S205 until determining that the in-focus position has been detected at step S206. The in-focus position herein is an in-focus position obtained by using the movement of the zoom lens group 101, and therefore a provisional in-focus position. When detecting the in-focus position, the lens control CPU 122 proceeds to step S207.

At step S207, the lens control CPU 122 stores to the EEPROM 125 a zoom lens position ZT and an image sensor position ST when the provisional in-focus position has been detected at step S206, as the telephoto end.

Next at step S208, the lens control CPU 122 searches for a true in-focus position (best focus position) where the AF evaluation value becomes maximum with movement of the focus lens group 104 from the provisional in-focus position.

Then at step S209, the lens control CPU 122 determines whether or not the true in-focus position has been detected. If determining that the true in-focus position has been detected, the lens control CPU 122 proceeds to step S210. If determining that the true in-focus position has not been detected, the lens control CPU 122 repeats the search of the true in-focus position.

At step S210, the lens control CPU 122 calculates a difference ΔFT between the true in-focus position FT_and the design in-focus position FT_INF' for the telephoto end and the infinitely far object distance, and then stores the difference ΔFT to the EEPROM 125. In image capturing, this stored difference ΔFT is used as a tracking adjustment value for the focus lens group 104 at the telephoto end.

Next at step S211, the lens control CPU 122 moves the zoom lens group 101 from the telephoto end ZT decided at step S207 to a zoom lens position ZW in the wide-angle direction by a stroke ZTW between the telephoto end and the wide-angle end, which is obtained as a design stroke. Then, the lens control CPU 122 stores the position of the zoom lens group 101 after that movement to the EEPROM 125 as a wide-angle end ZW of the zoom lens group 101.

Next at step S212, the lens control CPU 122 moves the image sensor 105 to a position SW corresponding to the zoom lens position (wide-angle end) ZW to which the zoom lens group 101 has been moved at step S211. Then, the lens control CPU 122 stores the image sensor position after that movement to the EEPROM 125 as a wide-angle end SW of the image sensor 105.

Next at step S213, the lens control CPU 122 searches for an in-focus position where the AF evaluation value becomes maximum with movement of the focus lens group 104 at the wide-angle end. The lens control CPU 122 repeats the process at step S213 until determining that the in-focus position has been detected at step S214. The lens control CPU 122 proceeds to step S215 when determining that the in-focus position has been detected at step S214.

At step S215, the lens control CPU 122 calculates a difference between the focus lens position that has been determined as the in-focus position at step S214 and the design in-focus position of the focus lens group 104, and determines whether or not the difference is within a predetermined amount. The difference larger than the predetermined amount shows that any abnormal situation may be generated, so that the lens control CPU 112 performs the processes from step S204 again. If the difference is within the predetermined amount, the lens control CPU 122 proceeds to step S216.

At step S216, the lens control CPU 122 calculates a difference ΔFW between an actual in-focus position FW_INF and a design in-focus position FW_INF' for the wide-angle end and the infinitely far object distance, and then stores the difference ΔFW to the EEPROM 125. In image capturing, this stored difference ΔFW is used as a tracking adjustment value for the focus lens group 104 at the wide-angle end. Thus, the lens control CPU 112 ends the processes.

The above-described tracking adjustment enables acquisition of the telephoto ends ZT and ST and the wide-angle ends ZW and SW of the zoom lens group 101 and the image sensor 105, and the tracking adjustment values ΔFT and ΔFW for the focus lens group 104 at these zoom lens positions (first zoom positions) ZT and ZW.

Moreover, adjusting the entire design zoom-focus tracking curve by using the differences ΔFT and ΔFW, that is, shifting the entire design zoom-focus tracking curve according to the differences ΔFT and ΔFW enables acquisition of the adjusted zoom-focus tracking curve. Performing the tracking control of the focus lens group 104 by using the adjusted zoom-focus tracking curve enables, in the image pickup apparatus that moves during zooming the image sensor 105 in the optical axis direction, the zooming with keeping the in-focus state, regardless of the apparatus manufacturing errors.

After the tracking adjustment at the telephoto end and the wide-angle end, the lens control CPU 122 detects the correction values at the plural intermediate zoom lens positions (second zoom positions) described in the flowchart of FIG. 5 in Embodiment 1.

While the description has been made of the tracking adjustment for the infinitely far object distance with reference to FIG. 8, tracking adjustment for plural finite object distances can be performed similarly thereto.

As described above, each of Embodiments 1 and can perform the tracking adjustment without complication in the image pickup apparatus in which the focus lens group 104 and the image sensor 105 are moved in the optical axis direction during the zooming. Moreover, each of Embodiments 1 and 2 can detect errors included in the adjusted zoom-focus tracking curve at the intermediate zoom lens positions as the correction values for the adjusted zoom-focus tracking curve (that is, the positions of the focus lens group 104). Therefore, each of Embodiments 1 and 2 enables use of the design zoom-image sensor tracking curve for the image sensor 105 without change, which can simplify the tracking adjustment as compared with the case of also adjusting the tracking curve for the image sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-157795, filed Jul. 12, 2010 which is hereby incorporated by reference herein in its entirety.

What is claimed is:

1. An image pickup apparatus comprising:
   a magnification-varying lens unit that is moved in an optical axis direction to perform variation of magnification;
   a correction lens unit that is moved in the optical axis direction during the variation of magnification to correct image plane variation caused due to the variation of magnification;
   an image sensor that photoelectrically converts an optical image formed by light passing through the magnification-varying lens unit and the correction lens unit, and is moved in the optical axis direction during the variation of magnification;
   a memory that stores first tracking data indicating a positional relationship of the magnification-varying lens unit and the correction lens unit, and stores second tracking data indicating a positional relationship of the magnification-varying lens unit and the image sensor;
   a controller that is configured to move the correction lens unit and the image sensor by using the first tracking data and the second tracking data, with the movement of the magnification-varying lens unit;
   an in-focus position detector that is configured to detect an in-focus position of the correction lens unit by using an output from the image sensor; and
   a tracking adjuster that is configured to obtain an adjustment value to be used for adjusting the first tracking data, by using a difference between (a) the in-focus position detected through the in-focus position detector in a state where the magnification-varying lens unit is located at a first zoom position and the image sensor is located at a position in the second tracking data corresponding to the first zoom position and (b) a position of the correction lens unit in the first tracking data corresponding to the first zoom position,
   wherein, when the first tracking data include a middle position at which an amount of a change of a position of the correction lens unit with respect to a change of a position of the magnification-varying lens unit is zero, the tracking data adjuster obtains the adjustment value at a wide-angle end, a telephoto end and the middle position.

2. An image pickup apparatus according to claim 1, wherein, when the first tracking data include a plurality of the middle positions, the tracking data adjuster obtains the adjustment value at the wide-angle end, the telephoto end and a middle position closest to the telephoto end in the middle positions.

3. An image pickup apparatus, comprising:
   a magnification-varying lens unit that is moved in an optical axis direction to perform variation of magnification;
   a correction lens unit that is moved in the optical axis direction during the variation of magnification to correct image plane variation caused due to the variation of magnification;
   an image sensor that photoelectrically converts an optical image formed by light passing through the magnification-varying lens unit and the correction lens unit, and is moved in the optical axis direction during the variation of magnification;
   a memory that stores first tracking data indicating a positional relationship of the magnification-varying lens unit and the correction lens unit, and stores second tracking data indicating a positional relationship of the magnification-varying lens unit and the image sensor;
   a controller that is configured to move the correction lens unit and the image sensor by using the first tracking data and the second tracking data, with the movement of the magnification-varying lens unit;
   an in-focus position detector that is configured to detect an in-focus position of the correction lens unit by using an output from the image sensor; and
   a tracking adjuster that is configured to obtain an adjustment value to be used for adjusting the first tracking data, by using a difference between (a) the in-focus position detected through the in-focus position detector in a state where the magnification-varying lens unit is located at a first zoom position and the image sensor is located at a position in the second tracking data corresponding to the first zoom position and (b) a position of the correction lens unit in the first tracking data corresponding to the first zoom position,
   wherein, when the first tracking data include no middle position at which an amount of a change of a position of the correction lens unit with respect to a change of a position of the magnification-varying lens unit is zero, the tracking data adjuster obtains the adjustment value at a wide-angle end and a telephoto end.

4. An image pickup apparatus, comprising:
   a magnification-varying lens unit that is moved in an optical axis direction to perform variation of magnification;
   a correction lens unit that is moved in the optical axis direction during the variation of magnification to correct image plane variation caused due to the variation of magnification;
   an image sensor that photoelectrically converts an optical image formed by light passing through the magnification-varying lens unit and the correction lens unit, and is moved in the optical axis direction during the variation of magnification;

a memory that stores first tracking data indicating a positional relationship of the magnification-varying lens unit and the correction lens unit, and stores second tracking data indicating a positional relationship of the magnification-varying lens unit and the image sensor;

a controller that is configured to move the correction lens unit and the image sensor by using the first tracking data and the second tracking data, with the movement of the magnification-varying lens unit;

an in-focus position detector that is configured to detect an in-focus position of the correction lens unit by using an output from the image sensor; and a tracking adjuster that is configured to obtain an adjustment value to be used for adjusting the first tracking data, by using a difference between (a) the in-focus position detected through the in-focus position detector in a state where the magnification-varying lens unit is located at a first zoom position and the image sensor is located at a position in the second tracking data corresponding to the first zoom position and (b) a position of the correction lens unit in the first tracking data corresponding to the first zoom position, wherein the tracking adjuster detects, through the in-focus position detector, the in-focus position of the correction lens unit in a state where the magnification-varying lens unit is located at a second zoom position different from the first zoom position and the image sensor is located at a position in the second tracking data corresponding to the second zoom position, and wherein the tracking data adjuster obtains, by using a difference between the in-focus position and a position of the correction lens in adjusted tracking data corresponding to the second zoom position, a correction value for correcting the adjusted tracking data, the adjusted tracking data being obtained by using the first tracking data and the adjustment value.

5. A method of adjusting tracking data in an image pickup apparatus comprising a magnification-varying lens unit that is moved in an optical axis direction to perform variation of magnification; a correction lens unit that is moved in the optical axis direction during the variation of magnification to correct image plane variation caused due to the variation of magnification; an image sensor that photoelectrically converts an optical image formed by light passing through the magnification-varying lens unit and the correction lens unit, and is moved in the optical axis direction during the variation of magnification; and a memory that stores first tracking data indicating a positional relationship of the magnification-varying lens unit and the correction lens unit, and stores second tracking data indicating a positional relationship of the magnification-varying lens unit and the image sensor, the method comprising a step of:

moving the correction lens unit and the image sensor by using the first tracking data and the second tracking data, with the movement of the magnification-varying lens unit;

detecting an in-focus position of the correction lens unit by using an output from the image sensor; and obtaining an adjustment value to be used for adjusting the first tracking data, by using a difference between (a) the in-focus position detected in a state where the magnification-varying lens unit is located at a first zoom position and the image sensor is located at a position in the second tracking data corresponding to the first zoom position and (b) a position of the correction lens unit in the first tracking data corresponding to the first zoom position, wherein, when the first tracking data include a middle position at which an amount of a change of a position of the correction lens unit with respect to a change of a position of the magnification-varying lens unit is zero, the tracking data adjuster obtains the adjustment value at a wide-angle end, a telephoto end and the middle position in the obtaining step.

6. A method of adjusting tracking data in an image pickup apparatus according to claim 5, wherein, when the first tracking data includes a plurality of the middle positions, the adjustment value is obtained at the wide-angle end, the telephoto end and the middle position in the obtaining step.

7. A method of adjusting tracking data in an image pickup apparatus comprising a magnification-varying lens unit that is moved in an optical axis direction to perform variation of magnification; a correction lens unit that is moved in the optical axis direction during the variation of magnification to correct image plane variation caused due to the variation of magnification; an image sensor that photoelectrically converts an optical image formed by light passing through the magnification-varying lens unit and the correction lens unit, and is moved in the optical axis direction during the variation of magnification; and a memory that stores first tracking data indicating a positional relationship of the magnification-varying lens unit and the correction lens unit, and stores second tracking data indicating a positional relationship of the magnification-varying lens unit and the image sensor, the method comprising the steps of:

moving the correction lens unit and the image sensor by using the first tracking data and the second tracking data, with the movement of the magnification-varying lens unit;

detecting an in-focus position of the correction lens unit by using an output from the image sensor; and obtaining an adjustment value to be used for adjusting the first tracking data, by using a difference between (a) the in-focus position detected in a state where the magnification-varying lens unit is located at a first zoom position and the image sensor is located at a position in the second tracking data corresponding to the first zoom position and (b) a position of the correction lens unit in the first tracking data corresponding to the first zoom position, wherein, when the first tracking data include no middle position at which an amount of a change of a position of the correction lens unit with respect to a change of a position of the magnification-varying lens unit is zero, the adjustment value is obtained at a wide-angle end and a telephoto end in the obtaining step.

8. A method of adjusting tracking data in an image pickup apparatus comprising a magnification-varying lens unit that is moved in an optical axis direction to perform variation of magnification; a correction lens unit that is moved in the optical axis direction during the variation of magnification to correct image plane variation caused due to the variation of magnification; an image sensor that photoelectrically converts an optical image formed by light passing through the magnification-varying lens unit and the correction lens unit, and is moved in the optical axis direction during the variation of magnification; and a memory that stores first tracking data indicating a positional relationship of the magnification-varying lens unit and the correction lens unit, and stores second tracking data indicating a positional relationship of the magnification-varying lens unit and the image sensor, the method comprising the steps of:

moving the correction lens unit and the image sensor by using the first tracking data and the second tracking data, with the movement of the magnification-varying lens unit;

detecting an in-focus position of the correction lens unit by using an output from the image sensor;

obtaining an adjustment value to be used for adjusting the first tracking data, by using a difference between (a) the in-focus position detected in a state where the magnification-varying lens unit is located at a first zoom position and the image sensor is located at a position in the second tracking data corresponding to the first zoom position and (b) a position of the correction lens unit in the first tracking data corresponding to the first zoom position, detecting the in-focus position of the correction lens unit in a state where the magnification-varying lens unit is located at a second zoom position different from the first zoom position and the image sensor is located at a position in the second tracking data corresponding to the second zoom position;

obtaining adjusted tracking data by using the first tracking data and the adjustment value; and obtaining a correction value for correcting the adjusted tracking data by using a difference between the in-focus position and a position of the correction lens in adjusted tracking data corresponding to the second zoom position.

* * * * *